(No Model.) 2 Sheets—Sheet 2.
A. WOLFF.
MUSIC BOX.
No. 470,610. Patented Mar. 8, 1892.
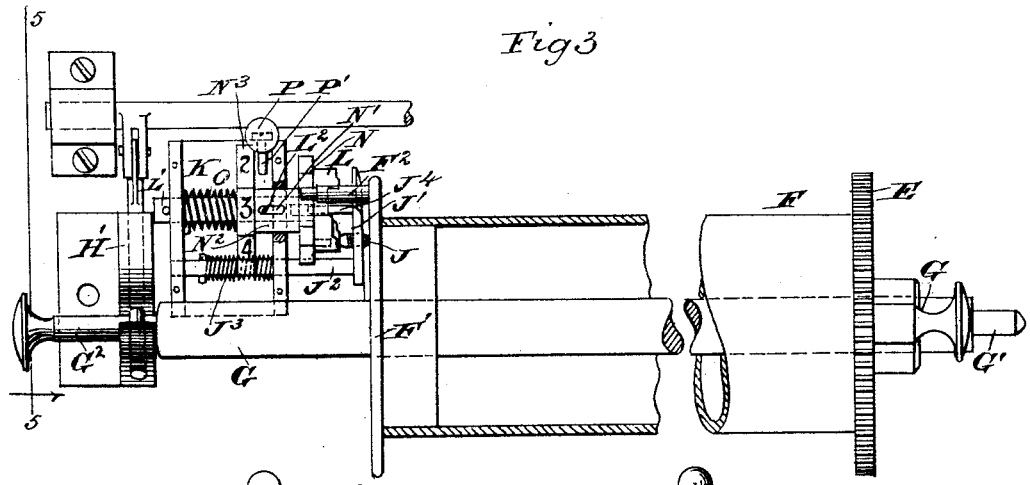
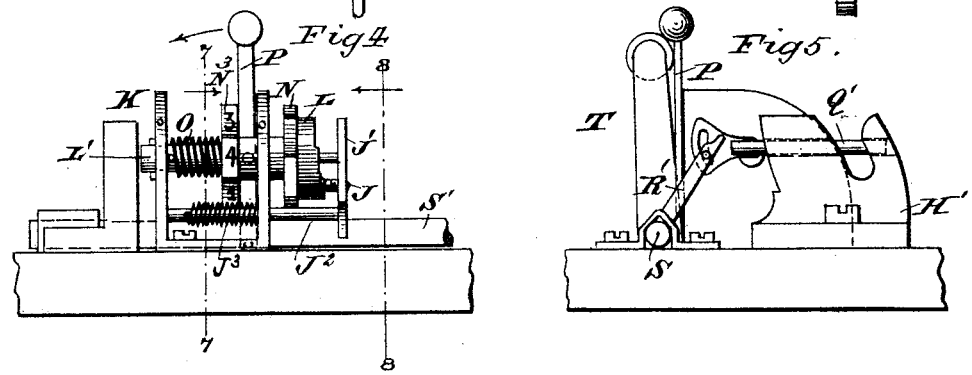
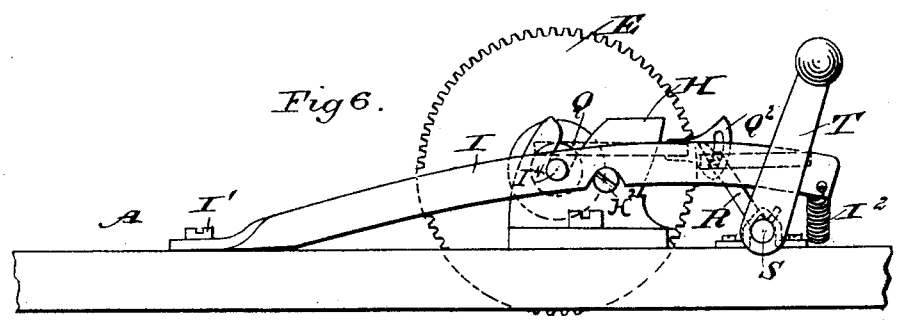
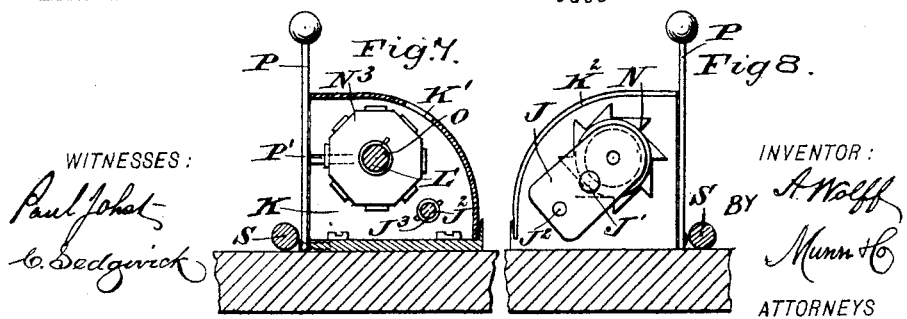

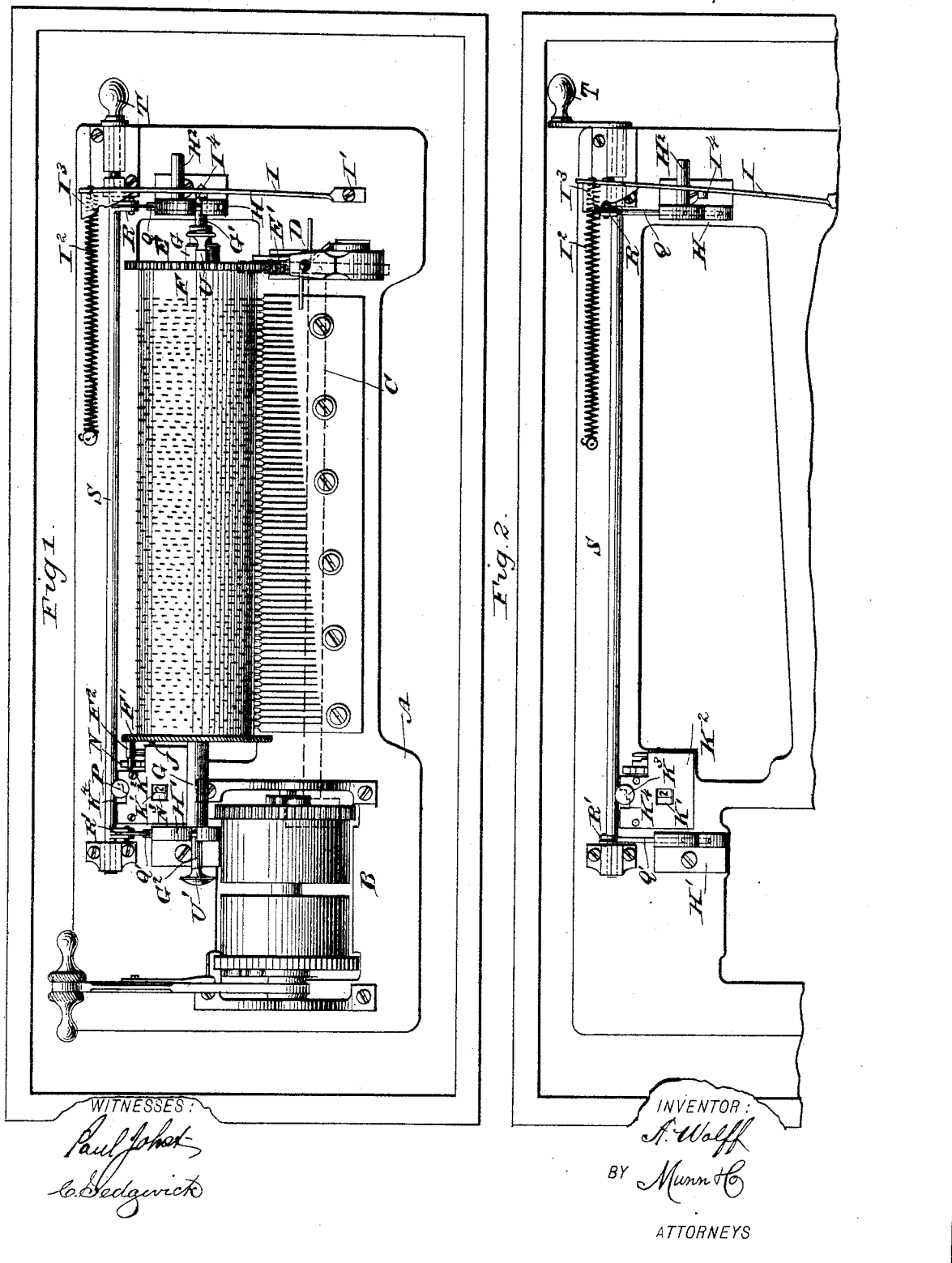

UNITED STATES PATENT OFFICE.

ALFRED WOLFF, OF RUTHERFORD, NEW JERSEY.

MUSIC-BOX.

SPECIFICATION forming part of Letters Patent No. 470,610, dated March 8, 1892.

Application filed December 23, 1891. Serial No. 415,956. (No model.)

*To all whom it may concern:*

Be it known that I, ALFRED WOLFF, a subject of the Emperor of Germany, at present residing at Rutherford, in the county of Bergen and State of New Jersey, have invented a new and Improved Music-Box, of which the following is a full, clear, and exact description.

The object of the invention is to provide a new and improved music-box which is simple and durable in construction and is arranged to open and close the bearings for the pin-cylinder for conveniently changing the cylinders without danger of injury to the pins.

The invention consists of a pin-cylinder secured on a shaft, a spring-pressed lever pressing on one end of the shaft, and a sliding pin against which the cylinder is pressed by the said lever.

The invention further consists of a mechanism for simultaneously opening the bearings for the pin-cylinder shaft and a spring for pressing the cylinder.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a like view of part of the same with the bearings open and the pin-cylinder removed. Fig. 3 is an enlarged plan view of part of the improvement with parts in section. Fig. 4 is a side elevation of the same. Fig. 5 is an end elevation of the same on the line 5 5 of Fig. 3. Fig. 6 is a similar view of the other end of the same. Fig. 7 is a transverse section of the changing mechanism on the line 7 7 of Fig. 4, and Fig. 8 is a like view of the same on the line 8 8 of Fig. 4.

The improved music-box is provided with the usual bed-plate A, on one end of which is arranged the driving mechanism B, of any approved construction and adapted to drive a shaft C, extending longitudinally under the bed-plate A and mounted to turn in suitable bearings fastened to the said bed-plate. This shaft C is geared with the governor D and with the gear-wheel E, fastened on the pin-cylinder F, rigidly secured on the shaft G, having the reduced ends G' and $G^2$, mounted to turn in the bearings H and H', respectively, secured on the base-plate A. The shaft G is mounted to turn in the bearings H and H' and is also fitted to slide therein longitudinally, so that the pins of the pin-cylinder F, change with relation to the comb without having the pin-cylinder movable on the shaft, as is the case in the music-boxes heretofore constructed. The reduced end G' of the shaft G projects beyond the bearing H and is engaged by a lever I, fulcrumed at I' on the bed-plate A and connected at its other end with a spring $I^2$, which moves the lever I against the reduced end of the shaft G', so as to hold the opposite end F' of the pin-cylinder in contact with a pin J, mounted to slide longitudinally, being controlled by a changing mechanism, hereinafter more fully described, and actuated from the pin-cylinder F. The pin J, which limits the inward sliding motion of the pin-cylinder F, caused by the spring-pressed lever I, is secured on a plate J', having a rod $J^2$ mounted to slide longitudinally in suitable bearings arranged in a casing K, attached to the bed-plate and forming the housing for the changing mechanism. A spring $J^3$ is coiled on the rod $J^2$ and presses on a pin on the same, so as to move the plate J' to the left to hold the pin J in contact with the edge of the cam-wheel L, mounted to turn and arranged in such a manner as to change the position of the pin-cylinder F with relation to the comb, according to the piece of music arranged on the pin-cylinder. The cam-wheel L is secured on the longitudinally-extending shaft L', mounted to turn in suitable bearings in the frame K, as is plainly illustrated in Figs. 3, 4, 7, and 8. On this shaft L' is secured a pin $L^2$, extending into a longitudinal slot N', formed in the hub $N^2$ of the ratchet-wheel N, adapted to be engaged by a pin $F^2$, projecting from the end F' of the pin-cylinder F. When the latter turns, the pin $F^2$ engages the rear tooth on the ratchet-wheel N, so that the latter is turned the distance of one tooth, and a like rotary motion is given by the pin $L^2$ to the shaft L', so that the cam-wheel L is turned and the pin J is pressed and shifted longitudinally to impart a sliding motion to the pin-cylinder F, so as to change the same and its pins with relation to the comb, according to the tune to be played. The ratchet-wheel N is held in an outermost position on the shaft L′ by a spring O, coiled on the said shaft and pressing on the hub N² of the said wheel. The mounting of the hub on the shaft L′ permits of sliding the ratchet-wheel N to the left, so that the said ratchet-wheel may be moved out of the path of the pin F² when it is desired to repeat the previous piece of music. It will be understood that when the ratchet-wheel N is shifted to the left the cam-wheel L remains in position, and consequently holds the pin J and cylinder F in the same positson it had during the previous tune.

On the end of the hub N² is secured an indicating-wheel N³, provided at its rim with numerals or other characters, which designate the piece of music to be played, the said characters appearing successively through an aperture K′, arranged in the cover K² of the frame K. Thus when the ratchet-wheel N is shifted by the pin F² at the commencement of each piece the indicating-wheel is likewise turned, so that the next following numeral appears in the opening K′, thus indicating the piece of music to be played. It is understood that the characters on the wheel N³ correspond with the like characters indicating the piece of music by name on the list usually accompanying the box.

In order to repeat the previous piece of music, the ratchet-wheel N is shifted to the left, and for this purpose a pin P′, held on a lever P, is adapted to engage the inner face of the indicating-wheel N³. The lever P is fulcrumed on the frame K and extends upward, so as to be within convenient reach of the operator, said lever being adapted to be locked in either position by engaging corresponding notches K³ and K⁴, formed in the cover K² of the frame K. (See Fig. 2.) By moving the lever P to the left it disengages the notch K³ and engages the notch K⁴, and at the same time the pin P′ presses on the indicating-wheel N³, and thus shifts the latter, as well as the hub N² and the ratchet-wheel N, in the same direction. The ratchet-wheel N is now out of the path of the pin F², and consequently the cylinder keeps on rotating without shifting the cam-wheel L, so that the same tune is played again. At the same time the shifting of the indicating-wheel N³ to the left still retains the same character in the opening K′, thus again indicating the same piece of music.

In order to properly guide the plate J′, carrying the pin J, the rod J⁴ is provided, projecting from the said plate J′ and extending centrally into the shaft L′, as is plainly shown in Fig. 3.

The bearings H and H′ for the reduced ends G′ and G² of the shaft G are formed with angular slots, as is plainly indicated in Figs. 5 and 6, so as to permit of conveniently dropping the reduced ends into the said bearings when changing the cylinders. In order to lock the reduced ends of the shaft G in place in the said bearings, pins Q and Q′ are provided, fitted to slide transversely into the said bearings H and H′, respectively, the said pins extending directly above the reduced ends G′ and G² to prevent the latter from jumping out of the bearings when the cylinder is revolved. The locking-pins Q and Q′ are pivotally connected at their rear ends with arms R and R′, respectively, projecting from a shaft S, extending longitudinally and mounted to turn in suitable bearings on the bed-plate A in the rear of the cylinder F. On one end of the shaft S is secured a crank-arm T, arranged within convenient reach of the operator, so that when the handle or crank-arm is moved rearward the shaft S is turned and its arms R and R′ pull the pins Q and Q′ rearward to unlock the reduced ends G′ and G² of the shaft G in the bearings H and H′, respectively. The rear end of the pin Q is adapted to engage a cam I³, formed on the free end of the lever I, so that when the said shaft S is turned by moving the handle T rearward, as above described, the rearward movement of the pin Q engages the cam I³, so that the lever I is swung outward and disengages the reduced end G′ of the shaft G, so that the shaft is completely unlocked—that is, unlocked from the lever I and so unlocked in the bearings H and H′ for convenient removal from the said bearings.

On the forward end of the pin-cylinder F is secured a knob U, and a like knob U′ is formed on the reduced end G² of the shaft G, so that the operator can conveniently take hold of the said knobs to place the shaft in its bearings or to remove the same with the pin-cylinder when interchanging those cylinders belonging to the box. It will be understood that the pinion E′, connecting with the gear-wheel E, is made sufficiently wide to permit of shifting the pin-cylinder longitudinally, according to the number of pieces to be played. It will be seen that by moving the handle T rearward the lever 1 is disengaged from the reduced end G′ of the shaft G, and at the same time the pins Q and Q′ are withdrawn to permit of conveniently removing the pin-cylinder, whether the latter is running or not. As shown in Figs. 1 and 6, the lever is preferably provided with a bearing I⁴, adapted to engage the pointed end of the reduced end G′ of the shaft, so as to prevent undue friction between the lever I and the shaft, and the bearing H of the shaft G is provided with a pin H², forming a support and guide for the lever I.

Having thus fully described my invention, I claim as new and desire to secure by Letters Patent—

1. In a music-box, the combination, with a pin-cylinder and a spring-pressed shaft rigidly carrying the said cylinder, of a pin mounted to slide longitudinally to hold the cylinder in proper relation to the comb, substantially as shown and described.

2. In a music-box, the combination, with a pin-cylinder and a spring-pressed shaft rigidly carrying the said cylinder, of a pin mounted to slide longitudinally to hold the cylinder in proper relation to the comb and a cam-wheel controlled from the said pin-cylinder and controlling the longitudinal movement of the said pin, substantially as shown and described.

3. A music-box provided with a pin fitted to slide and controlling the longitudinal sliding movement of the pin-cylinder, substantially as shown and described.

4. A music-box provided with mechanism for simultaneously unlocking the pin-cylinder shaft and the lever pressing on the shaft, substantially as shown and described.

5. In a music-box, the combination, with the shaft carrying the cylinder, of bearings for the said shaft, pins fitted to slide in the said bearings, and means for imparting a sliding motion to the said pins to open or close the bearings to unlock or lock the cylinder-shaft, substantially as shown and described.

6. In a music-box, the combination, with the shaft carrying the cylinder, of bearings for the said shaft, pins fitted to slide in the said bearings to lock or unlock the said shaft, a second shaft provided with arms pivotally connected with the said pins, and a handle held on the said second shaft to turn the same, substantially as shown and described.

7. In a music-box, the combination, with the shaft carrying the cylinder, of bearings for the said shaft, pins fitted to slide in the said bearings to lock or unlock the said shaft, a second shaft provided with arms pivotally connected with the said pins, a handle held on the said second shaft to turn the same, and a spring-pressed lever adapted to engage one end of the said shaft and provided with a cam engaged by one of the said pins, substantially as shown and described.

8. In a music-box, the combination, with a shaft on which the cylinder is secured, of a pin fitted to slide and adapted to impart a longitudinal motion to the said cylinder and its shaft, and a lever pressing on the said shaft to hold the cylinder in contact with the said pin, substantially as shown and described.

9. In a music-box, the combination, with a shaft on which the cylinder is secured, of a pin fitted to slide and adapted to impart a longitudinal motion to the said cylinder and its shaft, a lever pressing on the said shaft to hold the cylinder in contact with the said pin, and a spring pressing on the said lever, substantially as shown and described.

10. In a music-box, the combination, with a shaft on which the cylinder is secured, of a pin fitted to slide and adapted to impart a longitudinal motion to the said cylinder and its shaft, a lever pressing on the said shaft to hold the cylinder in contact with the said pin, and means for moving the said lever out of engagement with the said shaft, substantially as shown and described.

11. In a music-box, the combination, with a shaft on which the cylinder is secured, of a pin fitted to slide and adapted to impart a longitudinal motion to the said cylinder and its shaft, a lever pressing on the said shaft to hold the cylinder in contact with the said pin, and a cam-wheel controlled from the said cylinder and controlling the movement of the said pin, substantially as shown and described.

12. A music-box provided with a spring-pressed lever adapted to engage the cylinder-shaft to shift the cylinder laterally in one direction, substantially as shown and described.

13. A music-box provided with a spring-pressed lever adapted to engage the cylinder-shaft to shift the cylinder laterally in one direction and a pin fitted to slide longitudinally, controlled from the cylinder, and arranged to shift the latter longitudinally in an opposite direction to the movement given by the lever, substantially as shown and described.

14. In a music-box, the combination, with a pin mounted to slide and arranged to shift the pin-cylinder, of a cam-wheel engaging the said pin to impart a sliding motion to the same, and a ratchet-wheel mounted to turn and to slide on the shaft of the said cam-wheel and controlled from the pin-cylinder, substantially as shown and described.

15. In a music-box, the combination, with a pin mounted to slide and arranged to shift the pin-cylinder, of a cam-wheel engaging the said pin to impart a sliding motion to the same, a ratchet-wheel mounted to turn and to slide on the shaft of the said cam-wheel and controlled from the pin-cylinder, and an indicator-wheel held on the hub of the said ratchet-wheel, substantially as shown and described.

16. A music-box provided with a ratchet-wheel controlled from the pin-cylinder and carrying an indicator-wheel, substantially as shown and described.

17. In a music-box, the combination, with a pin mounted to slide and arranged to shift the pin-cylinder, of a cam-wheel engaging the the said pin to impart a sliding motion to the same, a ratchet-wheel mounted to turn and to slide on the shaft of the said cam-wheel and controlled from the pin-cylinder, and a lever for shifting the said ratchet-wheel on the shaft of the cam-wheel without disturbing the latter, substantially as shown and described.

ALFRED WOLFF.

Witnesses:
THEO. G. HOSTER,
C. SEDGWICK.